United States Patent
Veux

(10) Patent No.: US 8,251,460 B2
(45) Date of Patent: Aug. 28, 2012

(54) DEVICE FOR MOUNTING BEARINGS AND A CYCLE WHEEL AND HUB INCLUDING SUCH DEVICE

(75) Inventor: Jean-Luc Veux, Rumilly (FR)

(73) Assignee: Salomon S.A.S., Metz-Tessy (FR)

( * ) Notice: Subject to any disclaimer, the term of this patent is extended or adjusted under 35 U.S.C. 154(b) by 333 days.

(21) Appl. No.: 12/581,400

(22) Filed: Oct. 19, 2009

(65) Prior Publication Data

US 2010/0096913 A1    Apr. 22, 2010

(30) Foreign Application Priority Data

Oct. 20, 2008 (FR) ...................................... 08 05804

(51) Int. Cl.
*B60B 27/02* (2006.01)
*F16C 19/02* (2006.01)

(52) U.S. Cl. ........................ 301/110.5; 384/585; 384/517

(58) Field of Classification Search ............... 301/105.1, 301/110.5, 124.1; 384/517, 543, 544, 545
See application file for complete search history.

(56) References Cited

U.S. PATENT DOCUMENTS

| | | | | |
|---|---|---|---|---|
| 3,816,013 A | * | 6/1974 | Schuhmann | 403/368 |
| 4,173,376 A | * | 11/1979 | Standing et al. | 384/517 |
| 5,597,242 A | * | 1/1997 | Beeler | 384/517 |
| 6,402,257 B1 | | 6/2002 | Chen | |
| 7,758,250 B2 | * | 7/2010 | Kanehisa et al. | 384/545 |
| 2004/0108768 A1 | * | 6/2004 | Weiss et al. | 301/5.301 |

FOREIGN PATENT DOCUMENTS

| | | |
|---|---|---|
| DE | 201 08 155 U1 | 11/2001 |
| DE | 20 2006 006 548 U1 | 8/2006 |
| DE | 20 2007 005 699 U1 | 9/2007 |
| JP | 01288620 A * | 11/1989 |

* cited by examiner

*Primary Examiner* — Kip T Kotter
(74) *Attorney, Agent, or Firm* — Greenblum & Bernstein, P.L.C.

(57) ABSTRACT

Device including an inner shaft and an outer body rotatably mounted about an axis with respect to the shaft via at least one rolling bearing, the rolling bearing including an inner ring mounted on the inner shaft and an outer ring mounted in a housing of the outer body, the device including an automatic backlash elimination mechanism. The automatic backlash elimination mechanism includes a first washer having a tapered surface, and an elastic element in contact with the tapered surface of the first washer, the elastic element structured and arranged to generate a radial return force that is converted, by means of the tapered surface, into an axial force in order to eliminate the backlash related to the mounting of the rolling bearing. The first washer can be mounted on the shaft, in which case the elastic element generates a centripetal return force, or it can be mounted in the bore of the outer body, in which case the elastic element generates a centrifugal return force. A second washer can be provided so that the elastic element is positioned between the first washer and the second washer. The angle formed by the tapered surface and a plane perpendicular to the aforementioned axis is smaller than 12°. The invention also includes a wheel for a cycle, such as a bicycle, and a hub therefore which includes such device.

35 Claims, 7 Drawing Sheets

DEVICE FOR MOUNTING BEARINGS AND A CYCLE WHEEL AND HUB INCLUDING SUCH DEVICE

CROSS-REFERENCE TO RELATED APPLICATION

This application claims priority under 35 U.S.C. §119 of French Patent Application No. 08 05804, filed on Oct. 20, 2008, the disclosure of which is hereby incorporated by reference thereto in its entirety.

BACKGROUND OF THE INVENTION

1. Field of the Invention

The invention relates to the mounting of rolling bearings, whether angular or radial rolling bearings. In a particular exemplary field, the invention relates to rolling bearings mounted in the hub of a cycle, such as a bicycle.

2. Description of Background and Other Information

The use of rolling bearings is widely known in the field of cycles. In general, a rolling bearing includes an inner ring that is adjusted on the shaft, an outer ring that is positioned in the housing of the part adapted to rotate about the shaft and rolling elements which can be balls or rollers of any of various shapes. Installing rolling bearings requires various machining operations to prepare the surfaces which will receive the ball bearing races. These various machining operations are time-consuming and expensive. In addition, to achieve a precise mounting of the rolling bearings, it is necessary to adjust the backlash inside the bearing. A conventional solution for adjusting the backlash of the bearing involves using a backlash adjusting nut.

The use of a backlash adjusting nut requires having a threaded surface on the shaft. The threading of the shaft is also a difficult, time-consuming and expensive operation to carry out. Adjusting the backlash of the bearing using an adjusting nut has numerous disadvantages. First, it is necessary to make an adjusting nut, which is a complex machined part. Moreover, adjusting the backlash using the nut is a complex operation that requires a great deal of expertise insofar as an untrained user could overly tighten the nut, thus generating too much friction inside the rolling bearing, even too much pressure, which would cause an irreversible degradation of the bearing. Furthermore, using an adjusting nut is not a satisfactory solution insofar as this nut is capable of becoming loose, which would require adjusting the backlash once again.

SUMMARY

The invention provides a device for mounting bearings, which makes it possible to adjust the backlash more easily.

In addition, the invention provides a device for mounting a rolling bearing in which the backlash is adjusted automatically, rather than by means of a threaded backlash adjustment means.

Still further, the invention provides a hub for a bicycle wheel that includes a mechanism to adjust the backlash of the rolling bearings, such mechanism providing automatic adjustment of the backlash, requiring no user intervention.

Further still, the invention reduces the production cost of the hubs for bicycle wheels.

More specifically, the invention encompasses a device that includes an inner shaft and an outer body rotatably mounted about an axis "A" relative to the shaft by means of at least one rolling bearing, the rolling bearing including an inner ring mounted on the inner shaft and an outer ring mounted in a housing of the outer body; the device including a mechanism that automatically eliminates backlash which includes a washer comprising a tapered surface and an elastic element in contact with the tapered face of the first washer, the elastic pin being structured and arranged to generate a radial return force that is converted, by means of the tapered surface, into an axial force in order to eliminate the backlash related to the mounting of the rolling bearing.

In one non-limiting version of the invention, the first washer is mounted on the shaft and the elastic element generates a centripetal return force.

In another non-limiting version of the invention, the first washer is mounted in the bore of the outer body, and the elastic element generates a centrifugal return force.

In a particular example, the automatic backlash elimination mechanism includes a second washer and the elastic element is positioned between the first washer and the second washer.

Also encompassed by the invention is the conversion of the radial force exerted by the elastic element in an axial force being irreversible or quasi-irreversible.

In a particular non-limiting example, the angle formed by the tapered surface and the plane perpendicular to the axis "A" is smaller than 12°.

An exemplary, non-limiting, application of the invention is the provision of a hub for a wheel of a cycle, such as a bicycle wheel, which includes the device for mounting bearings including the automatic backlash elimination mechanism, as well as a cycle/bicycle wheel including such a hub.

BRIEF DESCRIPTION OF THE DRAWINGS

The invention will be better understood from the description that follows, with reference to the annexed drawings, in which.

DETAILED DESCRIPTION

Figure 1:
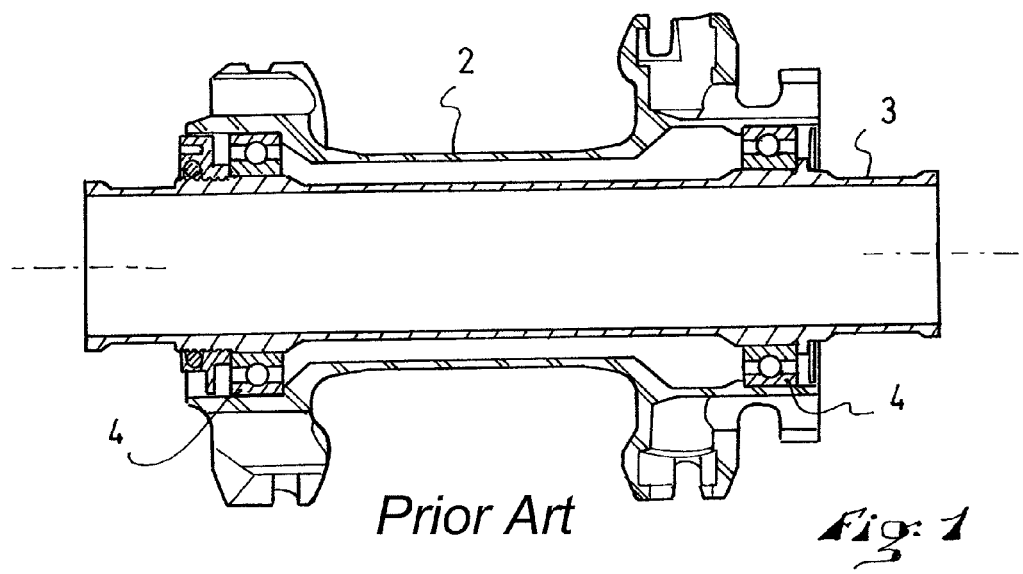
FIG. 1 is a cross-section of a hub of a cycle wheel according to the prior art.

FIG. 1 shows a cross-section of a hub for a cycle wheel according to the prior art. This hub includes an outer body 2 and an inner shaft 3. The outer body 2 is rotatably mounted on the inner shaft 3 by means of two bearings 4. The outer body 2 includes two flanges to which the spokes are attached. A housing adapted to receive the outer rings of the bearings 4 is provided in the area of each of the flanges. The inner shaft 3 is machined from a block of material, from an aluminum bar, for example, in order to obtain the bearing abutment shoulder, as well as the bearing seats and the threading for receiving the adjusting nut. The machining from a block, as well as the numerous machining and recovery operations make this inner shaft complex and expensive to produce. Moreover, the current trend involves increasing the diameter of the inner shaft. Although the shaft typically is approximately 10 mm in diameter, it is not uncommon to see inner shafts having a diameter of 15 mm or more. It can be easily understood that an inner shaft machined from a block is all the more expensive as it is large in diameter.

The backlash adjusting nut is also a part that is complex to manufacture because it is machined. In addition, adjusting the backlash is a difficult operation because the backlash must be calculated very precisely. Too much backlash generates a relative movement between the shaft and the outer body, while too little backlash risks damaging the bearings in the long term.

Figure 2:
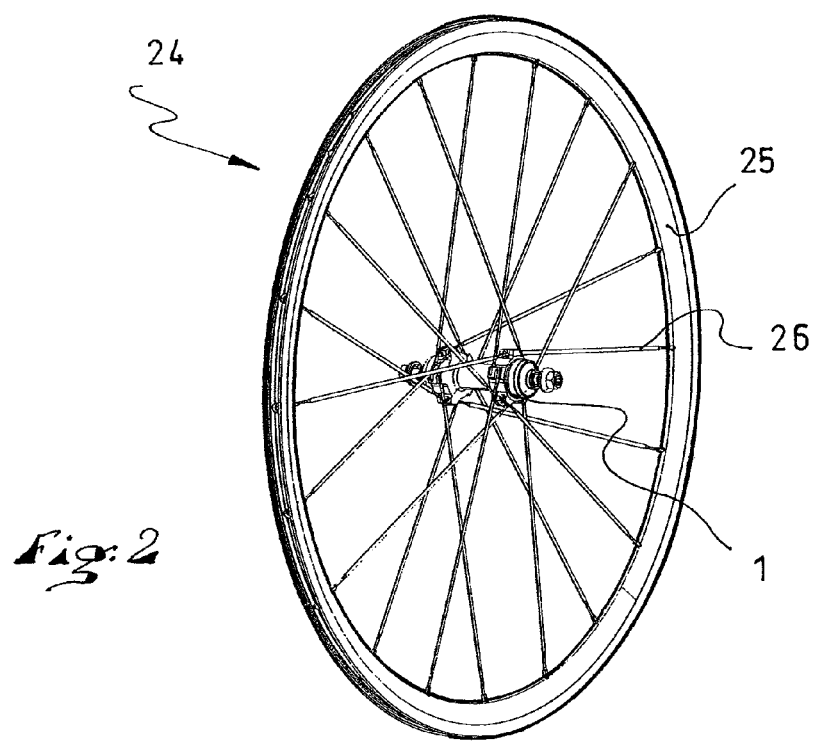
FIG. 2 is a general view of a cycle wheel according to the invention.

FIG. 2 illustrates a cycle wheel 24 according to the invention. It includes a rim 25 and of a hub 1, between which the spokes are 26 are tensioned.

Figure 3:
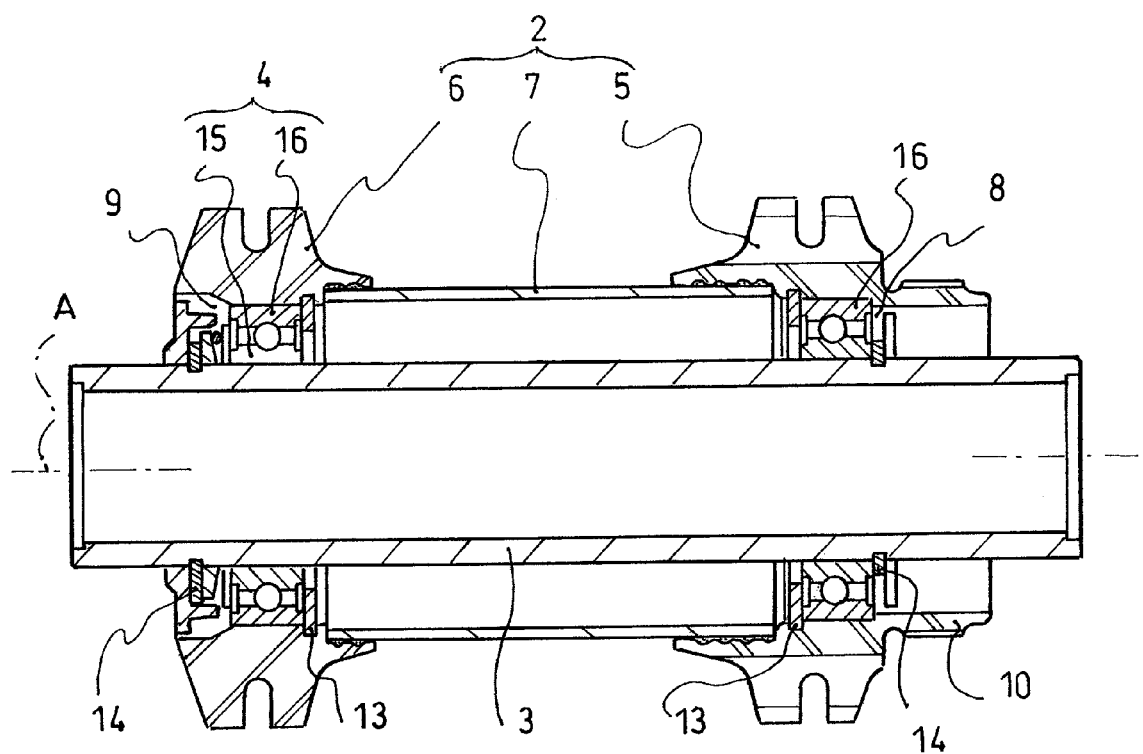
FIG. 3 is a cross-sectional view of a cycle hub according to the invention.

FIG. 3 illustrates a cross-sectional view of a hub according to a first embodiment. The hub includes an inner shaft 3 having an axis A and an outer body 2 that is rotatably mounted about the inner shaft 3. The inner shaft is adapted to be mounted to the frame of a bicycle. The outer body 2 includes an assembly of three sub-elements, namely, a left flange 6, a cylinder 7, and a right flange 5. Each of the left 6 and right 5 flanges is made by extrusion and machining of a material such as aluminum. The cylinder 7 can be made of the same material as the flanges, but it can also be made of a composite material such as carbon. Making the outer body 2 in three sub-elements is not a limiting characteristic of the invention. An outer body made as a single piece is also within the scope of the invention, as is the case in the prior art.

The two flanges 6 and 5 are affixed to the cylinder 7. They are bored with notches to be used for connecting the spokes. This is not a limiting characteristic of the invention, and any equivalent structure for fixing of the flanges to the cylinder is within the scope of the invention. The connection of the spokes to the flanges is not described in detail herein.

Housings 8 and 9 are provided in the right 5 and left 6 flanges, respectively, to receive the outer rings 16 of the bearings 4. The outer rings are mounted in the housings with tight adjustments.

The right flange 5 is extended rightward by a grooved barrel 10 for fixing a brake disc. The brake disc has an inner diameter smaller than the diameter of the right housing 8. A shoulder is thus created, against which the outer ring 16 comes to rest. To retain the outer ring in place, an elastic stop with centrifugal return force, also called circlip for bores 13, is positioned against the outer ring 16.

The outer ring 16 positioned in the left housing 9 is retained against a second circlip for bores 13.

The inner rings 15 are mounted on the inner shaft 3 with a free adjustment allowing for an axial displacement along their respective cylindrical surfaces. The inner ring 15 positioned in the right portion of the hub is retained against an elastic stop with centripetal return force, called a circlip for shafts 14.

The inner ring 15 positioned in the left portion of the hub is also retained against a circlip for shafts 14, except that an automatic backlash elimination structure is inserted between the circlip for shafts 14 and the inner ring 15.

In practice, the inner shaft 3 is mounted in the outer body 2 in the following manner. A first bearing is inserted from the left in the right housing 8 against the shoulder. A first circlip for bores 13 is then positioned against the outer ring of the first bearing. Next, a second circlip 13 is positioned in a groove arranged in the left housing 9. This circlip 13 serves as an axial stop for the second bearing, which is also inserted from the left inside the left flange. The inner shaft 3, at the right end of which a first circlip is positioned, is then slipped inside the hub until the first circlip comes into abutment against the inner ring of the right bearing. Finally, the components of the automatic backlash elimination mechanism are slipped on the left end of the inner shaft 3, the components of the automatic backlash elimination mechanism extend around the outer periphery of the inner shaft. As further explained below, and as shown in the drawings, rather than providing backlash adjustment for the bearing in the form of a threaded adjustment means, such as a backlash adjustment nut, as explained above, the invention provides an automatic backlash elimination mechanism.

Figure 4:
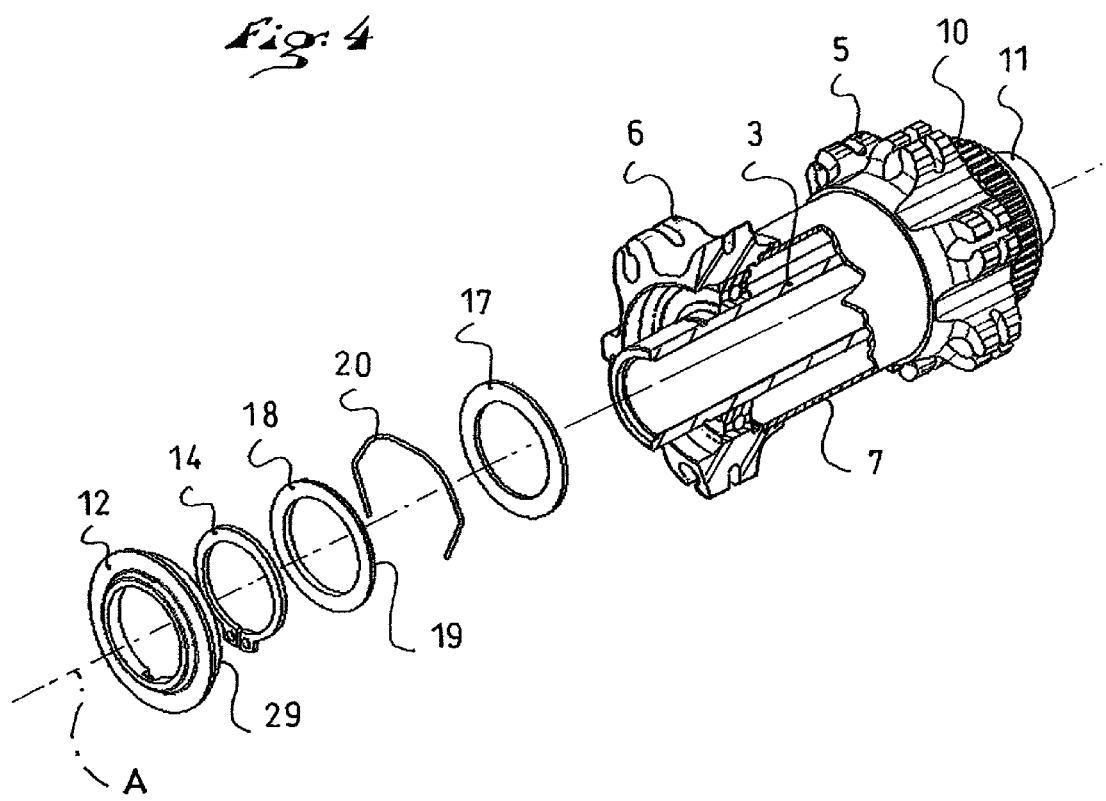
FIG. 4 is an exploded view of FIG. 3.

FIG. 4 shows a perspective, exploded view of the partially assembled hub, encompassed by the invention. In particular, the arrangement of the various components of the automatic backlash elimination mechanism can be seen. This mechanism includes a first washer, which is a tapered washer 18, a second washer, which is a flat washer 17, and an elastic element 20.

The flat washer 17 is slipped onto the inner shaft until it comes into abutment against the inner ring of the left bearing. The tapered washer 18, which includes at least one tapered surface 19, is also slipped on the inner shaft so that the tapered surface 19 is directed toward the inner ring of the left bearing. In the illustrated example, the washers are made from steel. An elastic element 20 is inserted between the flat washer 17 and the tapered washer 18.

Figure 10:
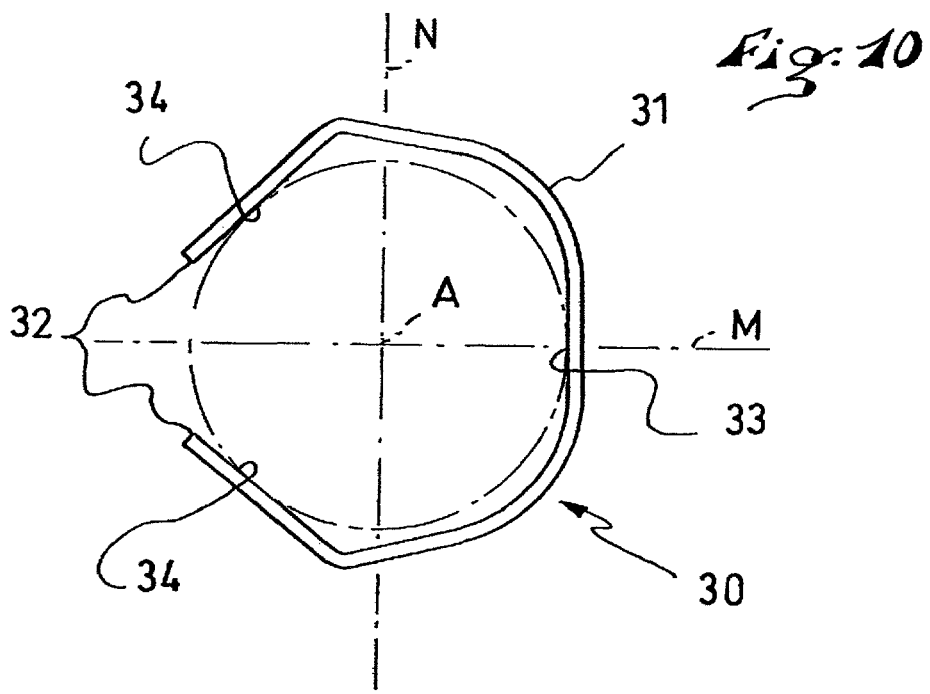
FIG. 10 is a front view of the pin of the embodiment of the invention.

In a first embodiment of the invention, the elastic element 20 is in the form of a pin 30 as shown in top view in FIG. 10. This pin is made from a bent wire which, at rest, defines a pin comprising a substantially circular portion (but extends from a first end to a second end around less than 360°) and forming a substantially C shape whose diameter at rest is smaller than the smallest of the diameters that it will be able to assume during the normal functioning of the automatic backlash elimination mechanism, i.e., in a use position of the pin in the mechanism. Thus, the radial elastic return force, i.e., an elastic bending force, is exerted in a centripetal direction and tends to bring the branches, or arms, of the C-shape closer together. That is, the arms of the C-shape are elastically biased together. In the example described here, the pin has a diameter of approximately 20 mm.

As can be seen in FIG. 10, the pin comprises a rear portion 31, which substantially defines a concave shape, and two arms 32 which are substantially rectilinear, or straight. The general shape of the pin is such that it has three points of contact with the washers. The pin can be said to have a shape that circumscribes an imaginary circle, that is, it extends around such imaginary circle and touches, but not intersect the imaginary circle at at least three points, as shown in FIG. 10. The pin can be said, alternatively, as shown in FIG. 10, to have a shape such that an imaginary circle is inscribed within the pin, that is, the imaginary circle touches but does not intersect the pin along its length from the end of one arm 32 to the end of the other arm 32, although pin contacts the imaginary circle along less than the entirety of the length of the pin. One of these contacts, i.e., the rear contact point 33, is located in the rear portion 31, on a median axis "M" of the pin 30. The other two contacts, called front contact points 34, are positioned in the area of the arms 32, in positions that are symmetrical to one another with respect to the median axis "M".

The front contact points 34 can change position on the arms depending upon the spreading apart of the pin. However, with respect to the rear contact point 33, they are always positioned beyond the normal axis "N", the normal axis being the axis perpendicular to the axis "M" passing through the axis "A". Thus, the pin 30 remains in a stable position centered on the axis "A" regardless of its spreading apart.

In illustrated non-limiting embodiments, the pin 30 is made from a wire having a circular cross section with a diameter ranging between 0.7 mm and 1.0 mm, and approximately equal to 0.8 mm in a particular exemplary embodiment. It is quite possible to use a pin made out of another material, such as plastic, for example. In addition, the cross section of the pin can have any contour.

A circlip 14 is positioned in a groove arranged at the surface of the inner shaft 3 in order to retain the two washers 17, 18 and the pin 30 against the inner ring of the bearing.

In the first embodiment of the invention, the automatic backlash elimination mechanism is mounted on the shaft according to the following sequence. Initially, the two washers are fitted on the shaft and the second circlip 14 is positioned in the groove adapted to receive it. Next, the pin 30 is inserted between the two washers. To do this, the pin must be spread apart until its diameter is larger than the outer diameter of the tapered washer 18. The pin 30 must be dimensioned, or structured and arranged, such that, at the time of the assembly, when it is spread apart in order to be able to pass over the tapered washer 18, the deformations which it undergoes remain in the elastic zone, and do not carry over to the plastic zone.

A left cap 12 is fitted on the left end of the shaft. The cap prevents the penetration of dust into the bearing. The left cap 12 includes a cylindrical collar 29 that projects from the cap towards the inside of the hub and whose diameter is larger than the outer diameter of the tapered washer and the maximum diameter which the elastic element 20 is capable of reaching during use. The function of the cylindrical collar 29 is to retain the element elastic in place between the two washers should the hub of the wheel be accidentally subject to very substantial axial forces, in particular axial forces higher than those to which a normal hub of a bicycle wheel is subject during normal use.

A right cap 11 is also force fitted on the right end of the inner shaft. The caps 11, 12 can be made out of plastic.

Figure 5:
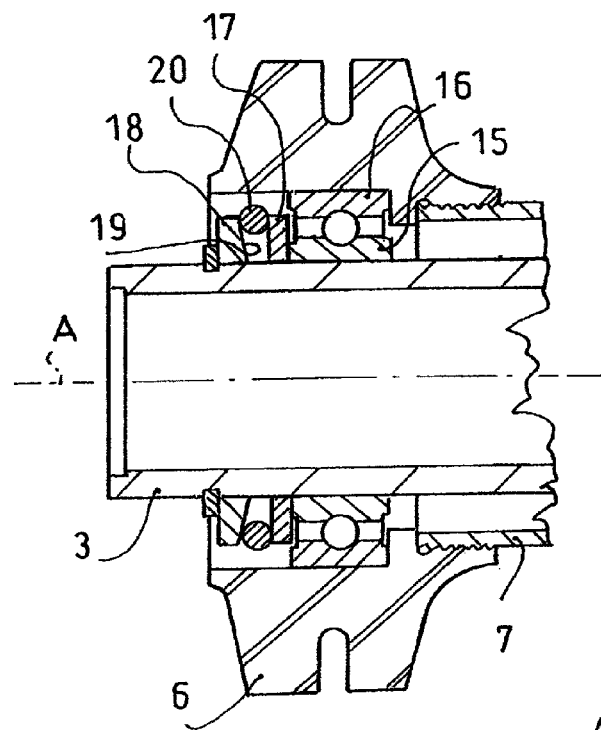
FIGS. 5, 6, and 7 are detailed views of the hub according to the invention.
Figure 6:
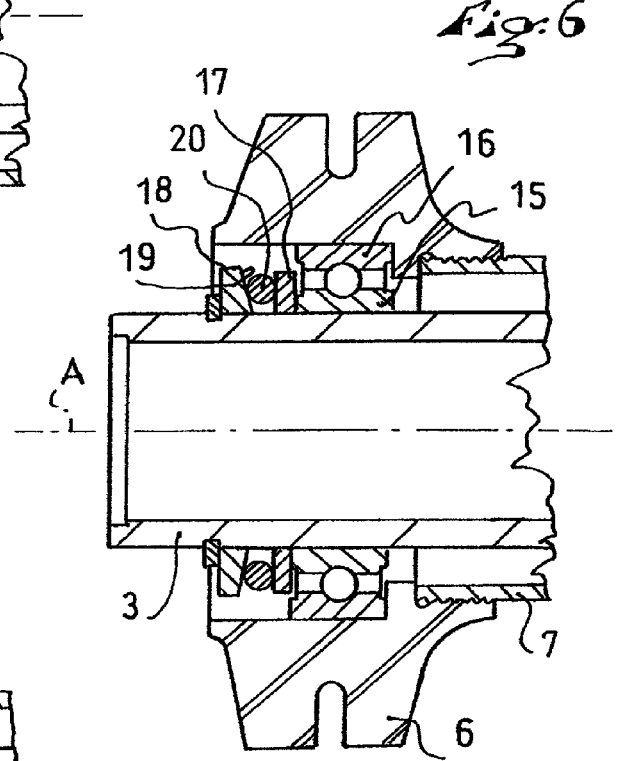
Figure 7:
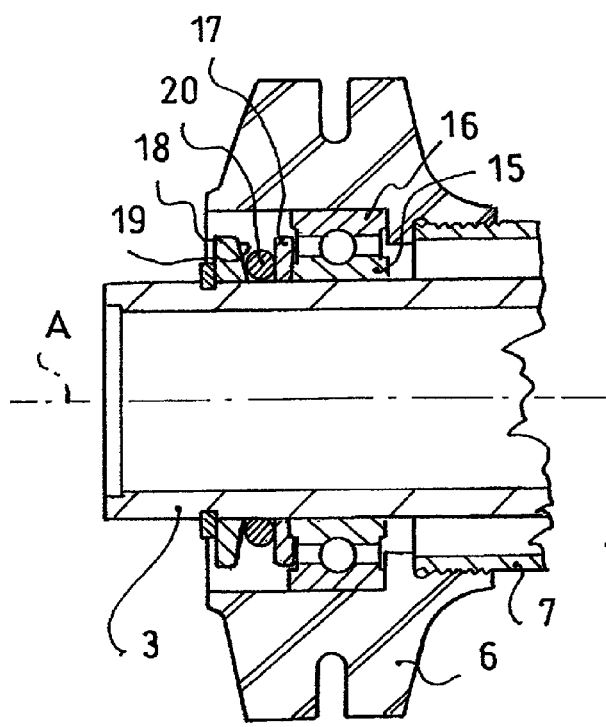

FIGS. 5, 6, and 7 schematically show the functioning of the automatic backlash elimination mechanism according to the first embodiment of the invention. The drawing figures are schematic insofar as certain details, such as the contours of the flange, are not reproduced identically.

In FIG. 5, the pin 30 is in the most open state. This is the situation in which there is very little backlash to eliminate. For example, it can be the arrangement of the automatic backlash elimination mechanism during the mounting of the hub, at the beginning of its lifespan. In this position, the pin reaches the maximum diameter which it will take during normal functioning. This diameter is approximately equal to 25 mm. The centripetal return force exerted by the pin is then maximal. The radial return force exerted by the pin is converted by means of the tapered surface 19 of the tapered washer 18 into an axial force which presses the flat washer 17 against the inner ring 15. In order to prevent damaging the bearing, it is important for the maximum axial force not to exceed 20 daN. For the backlash elimination, the components can be dimensioned, or structured and arranged, so that the maximum axial force that the automatic backlash elimination mechanism exerts is less than 1 daN. To this end, taking into account the slope of the tapered surface and the coefficients of friction of the contacts involved, i.e., the contact of the elastic element 20 with the two washers, the maximum radial return force the elastic element 20 must be capable of providing can be determined.

In the example described here, the slope of the tapered surface and the plane perpendicular to the axis A form an angle of 12°, and the pin and the washers are made out of metallic materials. From this, the radial elastic return force that must be exerted by the elastic element can be determined. In this case, because the elastic element is a pin, it is dimensioned, or structured and arranged, such that the pinching force—the force required to spread apart the two branches of the C—does not exceed 0.25 daN. For example, the elastic element is structured and arranged to apply a pinching force in a range between 10 g and 250 g (0.1 N and 2.5 N).

Advantageously, the conversion of the radial force exerted by the elastic element 20 into an axial force is irreversible or quasi-irreversible in the automatic backlash elimination mechanism according to the invention. In other words, when an axial force is exerted, for example between the inner shaft and the outer body, such axial force should not in turn be converted into a radial force by means of the automatic backlash elimination mechanism, as such radial force would tend to spread apart the pin 30. However, quasi-irreversibility is acceptable, i.e., if only the axial forces below a certain value are not converted into a spreading apart of the pin. In the example of a bicycle wheel hub described herein, the axial forces can reach a few tens of decaNewtons when the wheel is mounted on the bicycle. Therefore, the automatic backlash elimination mechanism is ensured to be irreversible as long as the axial forces are below a few hundreds of decaNewtons. In view of the materials used in this example, i.e., generally steel, the desired quasi-irreversibility is obtained with a tapered surface that forms an angle of 12° with respect to the plane perpendicular to the axis A.

In FIG. 6, the bearing takes a little backlash, which is automatically eliminated by the narrowing of the pin to a diameter smaller than 25 mm.

In FIG. 7, the bearing also takes some backlash, which is also automatically eliminated by the narrowing of the pin 20. Still in this arrangement, the diameter of the pin remains larger than the diameter it has at rest, so that it continues to exert a radial force. Thus, the flat washer continues to be pressed against the inner ring with a sufficient minimal axial force. It is estimated that this minimal axial force should not be less than 0.05 daN. To this end, the return force must be at least higher than 0.01 daN when the pin is in its position of minimal extension.

FIGS. 6 and 7 represent the hub illustrated in FIG. 5 at various moments in time and showing a change in, an adjustment of, the backlash of the bearing over time. It is also to be understood that FIG. 6 and FIG. 7, respectively, can be considered to be illustrative of a structure that is different from that of FIG. 5, within the same manufacturing batch. Indeed, in mass production, all the parts with the same reference do not rigorously have identical dimensions. For example, the same manufacturing batch can include hubs whose automatic backlash elimination mechanisms are in the position shown in FIG. 5, and others whose automatic backlash elimination mechanisms are in the positions shown in FIG. 6 and FIG. 7, respectively.

Advantageously, the automatic backlash elimination mechanisms according to the invention are structured and arranged to ensure the automatic elimination of the backlash of the bearings within a range of 0.5 mm using a pin made from a wire having a diameter between 0.7 mm and 1.0 mm, such as, for example, 0.8 mm.

The numerical values are given by way of explanation; they are related to the dimensions of the bicycle hub that is described here by way of example. In particular, the diameter values are to be taken into consideration with respect to the outer diameter of the inner shaft 3. In the example described here, this diameter is equal to 20 mm. Furthermore, for reasons of simplification, the diameter of the pin is mentioned hereinabove, although the pin is not rigorously circular. However, the portion of the pin, such as that forming the aforementioned C-shape, is substantially circular. In this regard, it is to be understood that the diameter of the pin corresponds to the diameter of an imaginary circle which extends through the points thereof which are in contact with the washers.

As shown in FIGS. 5-7 and other figures, the elastic pin 20 (and other parts of the automatic backlash elimination mechanism, such as the washers 17, 18) is axially covered. Specifically, as illustrated, the pin 20 is positioned within a housing of the flange 6 of the hub, the housing extending axially beyond the pin 20.

Figure 8:
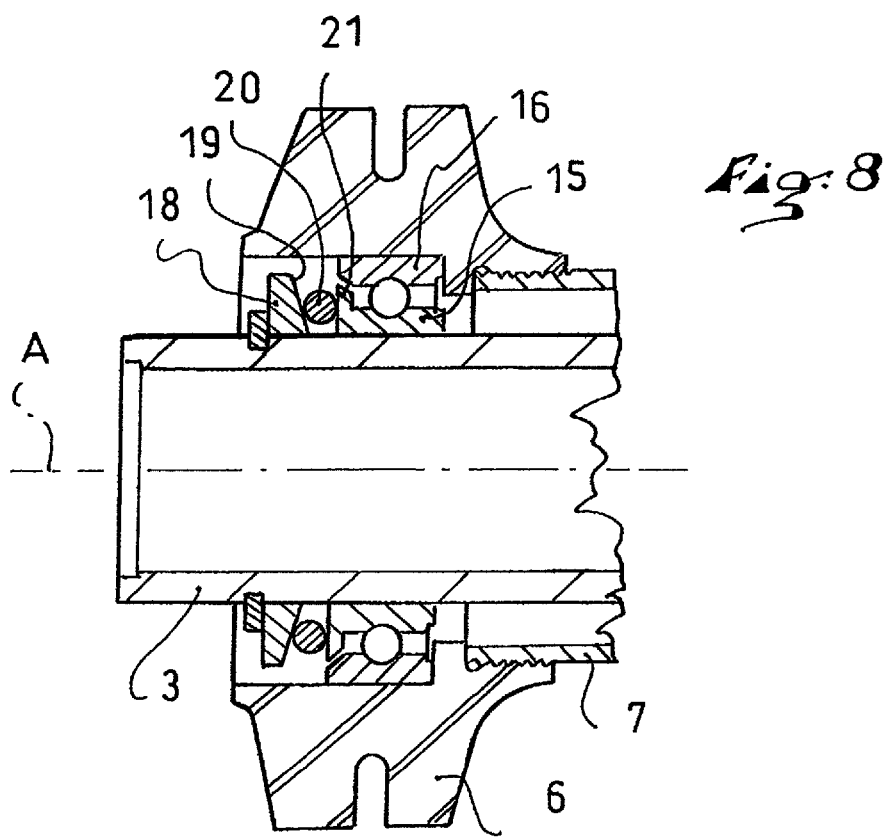
FIG. 8 is a detailed view showing a second embodiment of the invention.

FIG. 8 depicts a second embodiment of the invention, in which the automatic backlash elimination mechanism is constituted by a single washer 18 and a pin 20. The washer 18 has a tapered surface 19 which interacts with the pin in order to convert the centripetal radial return force thereof into an axial force. The pin 20 is in direct contact with the inner ring of the bearing. The inner ring of the bearing includes a lip 21 which prolongs the inner ring to guarantee contact with the pin regardless of its degree of expansion.

In an alternative embodiment not shown, the tapered surface is made directly on the circlip, which renders the use of the washer unnecessary.

Figure 9:
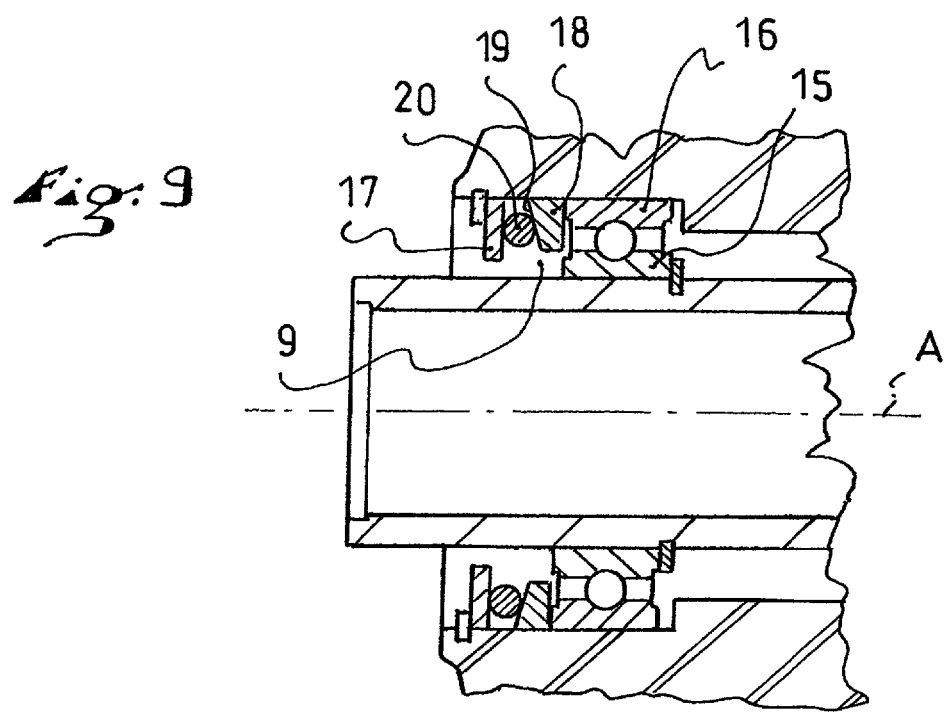
FIG. 9 is a detailed view showing a third embodiment of the invention.

FIG. 9 depicts a third embodiment of the invention, in which the automatic backlash elimination mechanism is no longer pressed against the inner ring 15 of the bearing but against the outer ring 16 thereof. The self-centering arrangement is then constituted by a first washer 18 having a tapered surface 19, which is inserted in the housing 9 that receives the outer ring 16 of the bearing. A second washer 17, which is flat, is also inserted in the housing 9.

An elastic pin 20 is positioned between the two washers 17 and 18. The elastic pin 20 is made from a bent wire which, at rest, defines a pin forming a substantially C shape whose diameter at rest is larger than the largest of the diameters that it will be able to assume during the normal functioning of the automatic backlash elimination mechanism. Thus, the radial elastic return force is exerted in a centrifugal direction and tends to spread apart arms of the C-shape. That is, the arms of the C-shape are elastically biased apart.

Figure 11:
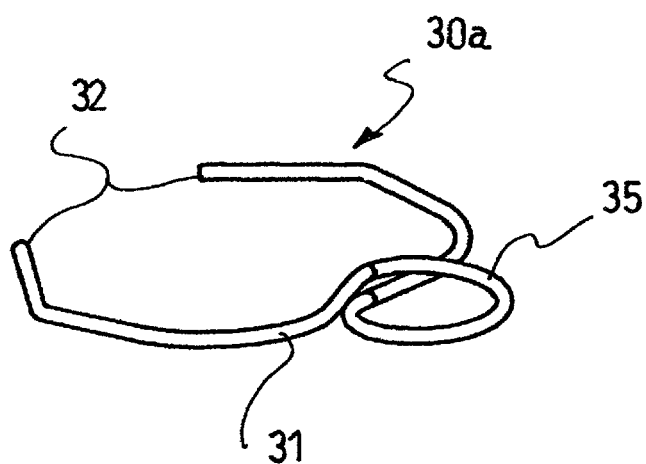
FIG. 11 is a perspective view of a pin according to an alternative embodiment of the invention.

FIG. 11 shows a pin according to an alternative embodiment of the invention. As with the pin shown in FIG. 10, the pin 30a can be made from a wire, but also by using other materials and various methods. The pin comprises a rear portion 31 which substantially forms an incurved shape, i.e., a concave shape, and two arms 32 that are substantially rectilinear, i.e., substantially straight. The general shape of the pin is such that it has three points of contact with the washers. This pin has a rear portion 31 that includes a complementary elastic portion 35. The elastic portion 35 is constituted by a loop of the wire which is located in the plane of the pin 30a.

Figure 12:
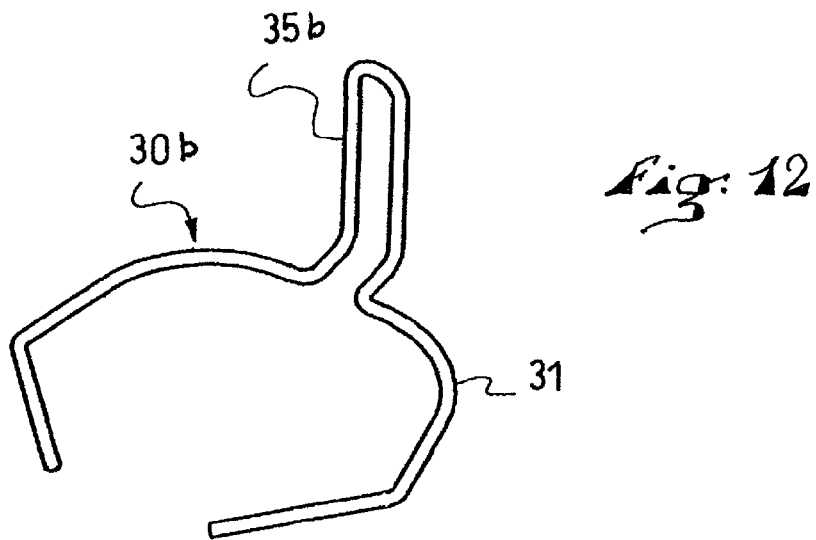
FIG. 12 is a perspective view of a pin according to another alternative embodiment of the invention.

FIG. 12 also shows an alternative embodiment of the pin 30b, which is identical to that shown in FIG. 11, except that the complementary elastic portion 35b is constituted by a loop of the wire extending in a plane perpendicular to the plane of the pin, i.e., the plane containing the points of contact of the pin with the washers.

Figure 13:
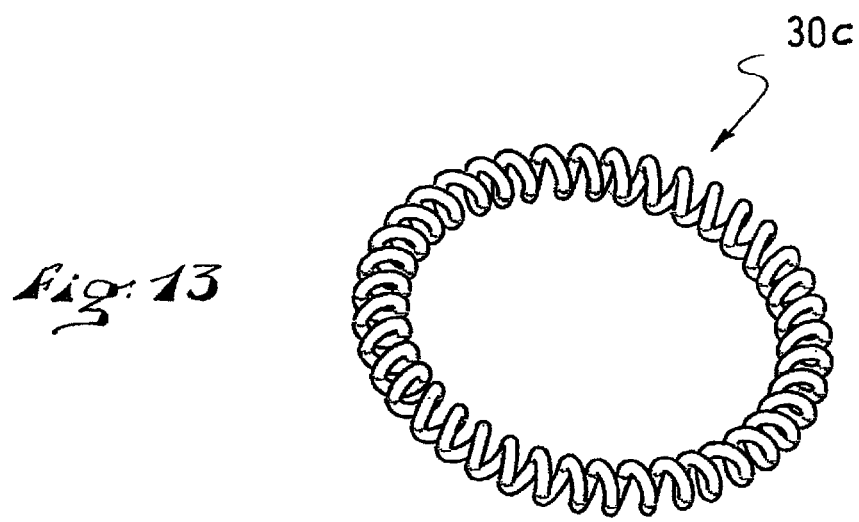
FIG. 13 is a perspective view of a pin according to another alternative use.

FIG. 13 shows another alternative embodiment of the pin 30c, the pin being made from a spiral spring extending in a circle.

Figure 14:
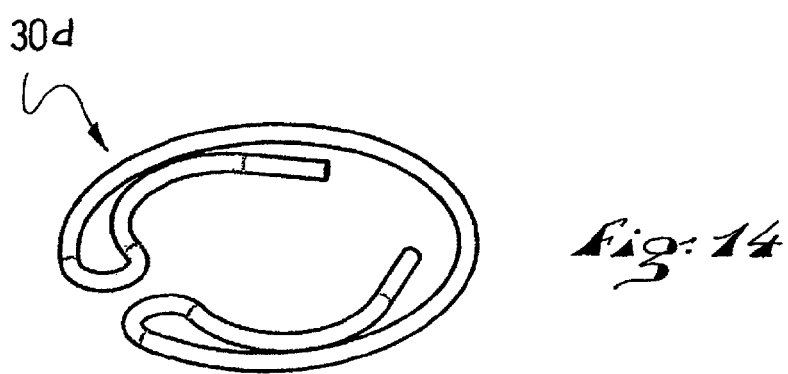
FIG. 14 is a perspective view of a pin according to another alternative use.

FIG. 14 shows another alternative embodiment of the pin 30d, which is characterized by an amplitude of deformation greater than that of the pin shown in FIG. 10 while maintaining a reduced volume requirement. Indeed, in this alternative, it is not necessary to provide a complementary elastic portion.

The embodiments and alternative embodiments have been described hereinabove by way of example, and the invention encompasses any and all equivalent embodiments.

This invention illustratively disclosed herein suitably may be practiced in the absence of any element which is not specifically disclosed herein.

The invention claimed is:

1. A device comprising:
   an inner shaft;
   at least one rolling bearing;
   an outer body rotatably mounted about an axis with respect to said shaft by means of said at least one rolling bearing;
   said rolling bearing including an inner ring mounted on said inner shaft and an outer ring mounted in a housing of said outer body;
   said inner ring having a cylindrical inner surface;
   an automatic backlash elimination mechanism comprising:
      a washer having a tapered surface;
      an elastic element in contact with said tapered surface of said washer, said elastic element being structured and arranged to generate a radial elastic return force that is converted, via said tapered surface, into an axial force to provide backlash adjustment of said rolling bearing without user intervention.

2. A device according to claim 1, wherein:
   said washer is mounted on said inner shaft;
   said elastic element is structured and arranged to generate a centripetal elastic return force.

3. A device according to claim 1, wherein:
   said washer is mounted in a bore of said outer body;
   said elastic element structured and arranged to generate a centrifugal elastic return force.

4. A device according to claim 1, wherein:
   said washer is a first washer;
   said device further comprises a second washer;
   said elastic element is positioned between said first washer and said second washer.

5. A device according to claim 1, wherein:
   an angle formed by said tapered surface and a plane perpendicular to said axis is 12° or less than 12°.

6. A device according to claim 1, wherein:
   said elastic element is structured and arranged to apply an elastic pinching force in a range between 10 g and 250 g (0.1 N and 2.5 N).

7. A device according to claim 1, wherein:
   said elastic element is a pin having a portion extending in an arc about the inner shaft.

8. A device according to claim 1, wherein:
   said elastic element is structured and arranged to apply a pinching force that does not exceed 0.25 daN.

9. A device according to claim 1, wherein:
   said elastic element is a pin having a substantially C-shape.

10. A device according to claim 9, wherein:
    the substantially C-shape of the pin has a length extending between two ends and around the axis of the outer body from a first to a second of the two ends;

an imaginary circle is inscribed within a contour of the pin, the imaginary circle thereby touching the pin at at least three points of the pin but touching less than an entirety of the length of the pin.

11. A device according to claim 10, wherein:
the pin has a median axis (M) and a normal axis (N), the normal axis being perpendicular to the median axis;
both the median and normal axes extend through the axis of the outer body;
a first of the three contact points of the pin is on the median axis (M) and spaced from the normal axis (N) on a first side of the normal axis (N);
a second and a third of the three contact points are spaced from the normal axis (N) on a second side of the normal axis (N).

12. A device according to claim 1, wherein:
said elastic element is a pin having a substantially C-shape extending around the axis of the outer body;
the substantially C-shape of the pin includes a pair of spaced-apart arms;
the radial elastic return force is an elastic bending force elastically biasing the arms of the substantially C-shape of the pin closer together.

13. A device according to claim 1, wherein:
said elastic element is a pin having a substantially C-shape extending around the axis of the outer body;
the substantially C-shape of the pin includes a pair of spaced-apart arms;
the radial elastic return force is an elastic bending force elastically biasing the arms of the substantially C-shape of the pin apart.

14. A device according to claim 1, wherein:
the elastic element has a length extending from a first end to a second end less than 360° around the axis of the outer body;
inscribed within the length of the elastic element is an imaginary circle;
the elastic element touches the imaginary circle non-continuously from the first end to the second end of the length of the elastic element.

15. A device according to claim 1, wherein:
the elastic element is made of metal.

16. A device according to claim 1, wherein:
the elastic element is a wire having a length extending about the inner shaft;
a cross section through the length of the wire has a curved outer surface.

17. A device according to claim 16, wherein:
the cross section is a circular cross section.

18. A device according to claim 17, wherein:
said circular cross section of the wire diameter between 0.7 mm and 1.0 mm.

19. A device according to claim 1, wherein:
the elastic element is a bent wire extending from a first end to a second end less than 360° around the axis of the outer body;
the bent wire applies either a centrifugal or centripetal elastic bending force against the tapered surface of the washer.

20. A device according to claim 1, wherein:
the washer of the automatic backlash elimination mechanism extends around an outer periphery of the inner shaft.

21. A device according to claim 1, wherein:
no threaded adjustment means is included for backlash adjustment.

22. A device according to claim 1, wherein:
the outer body extends axially over, and covers, the elastic element.

23. A hub according to claim 22, wherein:
the outer body includes a housing;
the elastic element is mounted in the housing.

24. A device according to claim 1, further comprising:
a dust cap is mounted over the inner shaft to prevent dust penetration into the bearing.

25. A hub for a cycle wheel comprising:
an inner shaft adapted to be mounted to a frame of the cycle;
at least one rolling bearing;
an outer body rotatably mounted about an axis with respect to said shaft by means of said at least one rolling bearing;
said rolling bearing including an inner ring mounted on said inner shaft and an outer ring mounted in a housing of said outer body;
said inner ring having a cylindrical inner surface;
an automatic backlash elimination mechanism comprising:
a washer having a tapered surface;
an elastic element in contact with said tapered surface of said washer, said elastic element being structured and arranged to generate a radial elastic return force that is converted, via said tapered surface, into an axial force to provide backlash adjustment of said rolling bearing without user intervention.

26. A hub according to claim 25, wherein:
the washer of the automatic backlash elimination mechanism extends around an outer periphery of the inner shaft.

27. A hub according to claim 25, wherein:
no threaded adjustment means is included for backlash adjustment.

28. A hub according to claim 25, wherein:
the outer body extends axially over, and covers, the elastic element.

29. A hub according to claim 28, wherein:
the outer body comprises a left flange and a right flange;
one of the left and right flanges includes a housing;
the elastic element is mounted in the housing.

30. A cycle wheel comprising:
a hub;
a rim;
spokes extending between the hub and the rim;
the hub comprising:
an inner shaft adapted to be mounted to a frame of the cycle;
at least one rolling bearing;
an outer body rotatably mounted about an axis with respect to said shaft by means of said at least one rolling bearing;
said rolling bearing including an inner ring mounted on said inner shaft and an outer ring mounted in a housing of said outer body;
said inner ring having a cylindrical inner surface;
an automatic backlash elimination mechanism comprising:
a washer having a tapered surface;
an elastic element in contact with said tapered surface of said washer, said elastic element being structured and arranged to generate a radial elastic return force that is converted, via said tapered surface, into an axial force to provide backlash adjustment of said rolling bearing without user intervention.

31. A cycle wheel according to claim 30, wherein:
the washer of the automatic backlash elimination mechanism extends around an outer periphery of the inner shaft.
32. A cycle wheel according to claim 30, wherein:
no threaded adjustment means is included for backlash adjustment.
33. A cycle wheel according to claim 30, further comprising:
the outer body extends axially over, and covers, the elastic element.
34. A cycle wheel according to claim 33, wherein:
the outer body of the hub comprises a left flange and a right flange;
one of the left and right flanges includes a housing;
the elastic element is mounted in the housing.
35. A device comprising:
an inner shaft;
at least one rolling bearing;
an outer body rotatably mounted about an axis with respect to the shaft by means of the at least one rolling bearing;
the rolling bearing including an inner ring mounted on the inner shaft and an outer ring housed within the outer body;
an automatic backlash elimination mechanism comprising:
a washer having a tapered surface;
an elastic element in contact with the tapered surface of the washer, the elastic element being structured and arranged to generate a radial elastic return force that is converted, via the tapered surface, into an axial force to provide backlash adjustment of the rolling bearing without user intervention;
the outer body extending axially over and covering the elastic element of the automatic backlash elimination mechanism.

* * * * *